No. 831,933. PATENTED SEPT. 25, 1906.
H. R. COMLY.
ROTARY PUMP.
APPLICATION FILED MAR. 8, 1905.
2 SHEETS—SHEET 2.
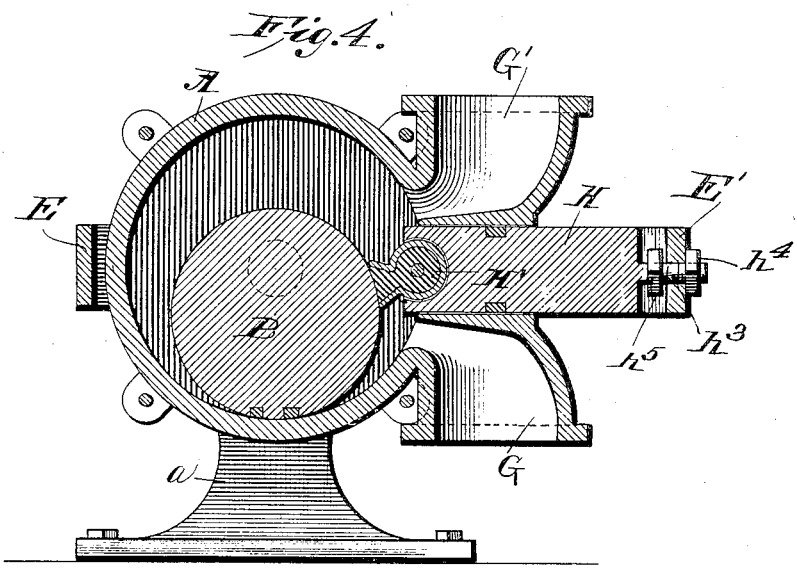
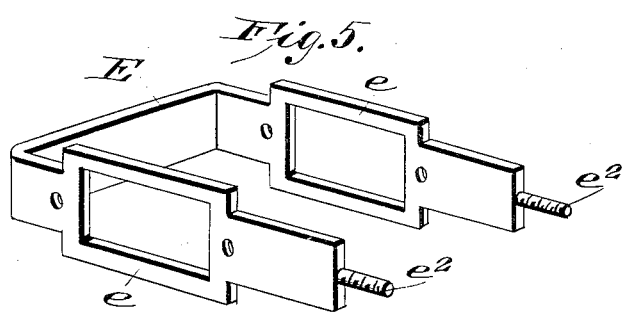
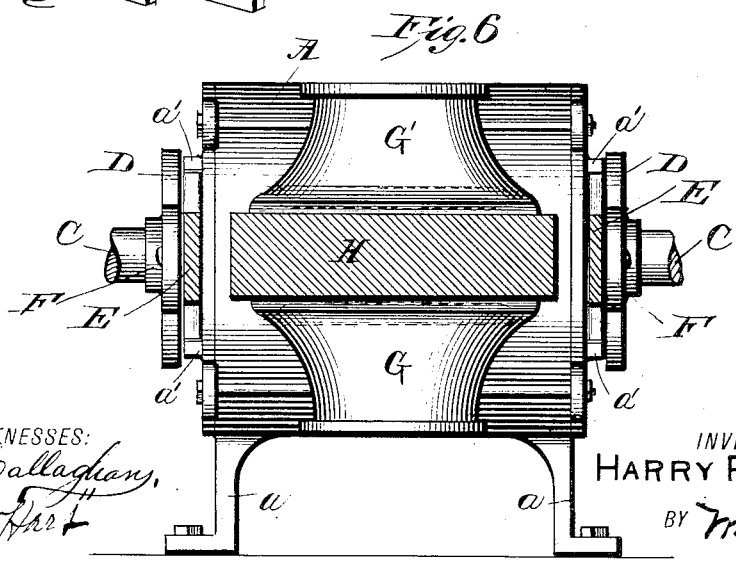
INVENTOR
HARRY R. COMLY
ATTORNEYS

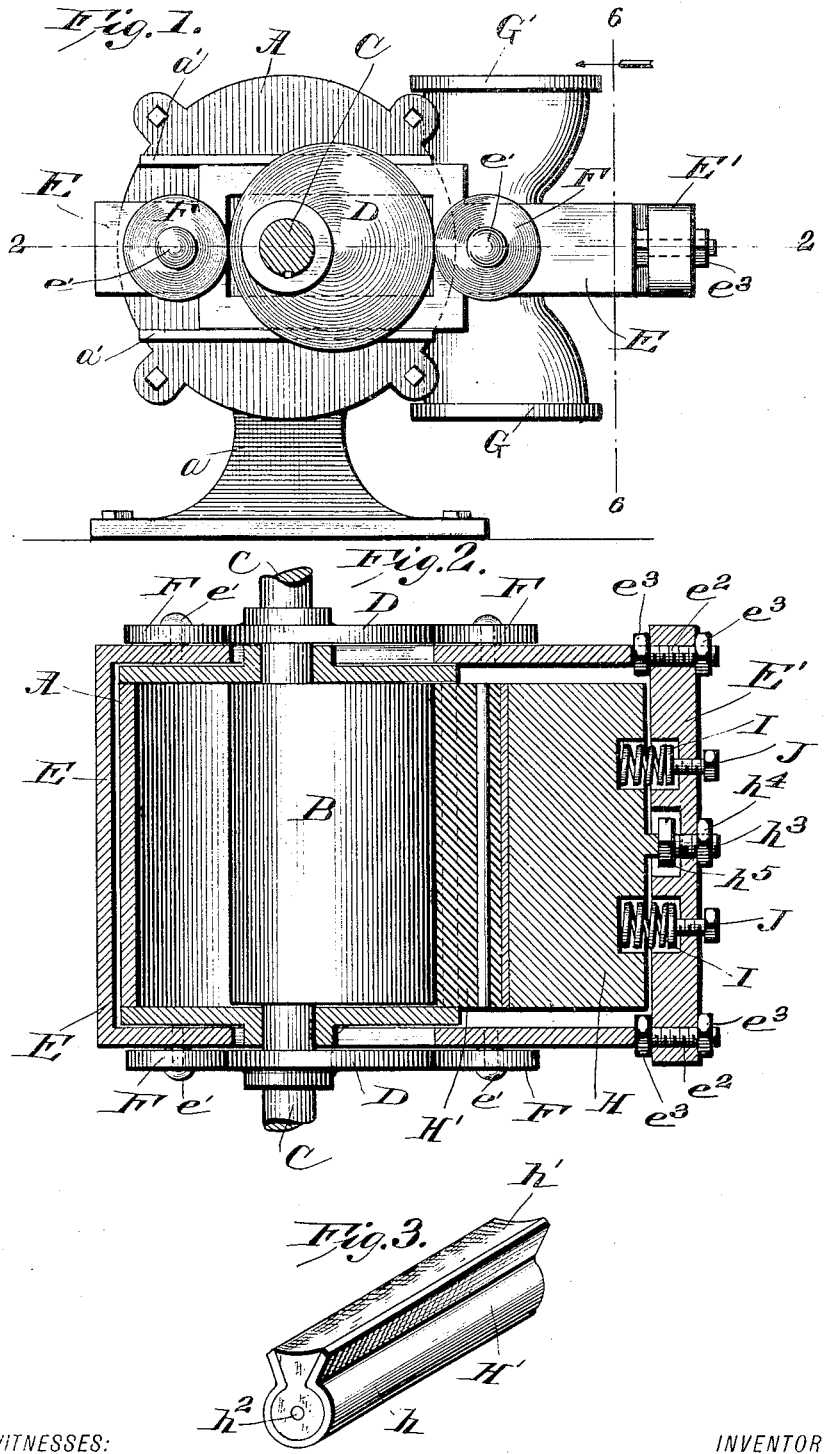

UNITED STATES PATENT OFFICE.

HARRY RETZER COMLY, OF SAN DIEGO, CALIFORNIA.

ROTARY PUMP.

No. 831,933.      Specification of Letters Patent.      Patented Sept. 25, 1906.

Application filed March 8, 1905. Serial No. 249,118.

*To all whom it may concern:*

Be it known that I, HARRY RETZER COMLY, a citizen of the United States, and a resident of San Diego, in the county of San Diego and State of California, have invented an Improvement in Rotary Pumps, of which the following is a specification.

My invention is an improvement in that class of rotary pumps which comprise a cylinder, a cylindrical piston arranged eccentrically therein, and a slidable abutment or cut-off which reciprocates corresponding to the rotation of the piston, whereby fluid is taken in and ejected from the cylinder at each rotation of the piston.

The features of novelty are hereinafter described and claimed.

In the accompanying drawings, Figure 1 is an end view of my improved pump. Fig. 2 is a horizontal section on the line 2 2 of Fig. 1. Fig. 3 is a perspective view of a device which is pivoted to the sliding abutment or cut-off and works in contact with the rotary piston. Fig. 4 is a vertical section on line 4 4 of Fig. 2. Fig. 5 is a perspective view of a reciprocating frame to which the sliding abutment or cut-off is attached. Fig. 6 is a section on the line 6 6 of Fig. 1.

A hollow cylinder A is arranged horizontally and supported upon a suitable pedestal *a*. (See Figs. 1, 4, and 6.) A cylindrical piston B is arranged within the cylinder A and mounted eccentrically upon a shaft C, which has its bearings in the ends of the cylinder and is concentric therewith. Upon the said shaft C, exteriorly to the heads of the cylinder A, are keyed cams D, the same being practically disks arranged eccentrically upon the shaft. A frame E, (see Fig. 5,) forming three sides of a rectangle, is arranged in connection with the cylinder A, so that its side portions are parallel and contiguous to the ends of the cylinder, as will be understood by reference to Figs. 1 and 2. The side portions or arms of this frame E are provided with loops *e*, which are practically oblong rectangles. The shaft C passes through the openings in these loops, which thus allow the frame E to be reciprocated without contact with the shaft, as will be readily understood. Each side member or arm of the frame E is provided with two stub axles or journals $e'$ $e'$, (see Fig. 2,) upon which are journaled disks or wheels F. The distance between the peripheries of each pair of wheels F is the same as the diameter of the cams D, and, as shown in Figs. 1 and 2, the cams thus work in contact with the wheels F. It is apparent that if the shaft C be rotated the cams D will reciprocate the frame E horizontally. The frame is guided in its movement by the flanges or ribs $a'$, which are attached to and preferably cast integrally with the ends of the cylinder A. The cylinder A is provided on one side with an induction-port G and an eduction-port G', as shown plainly in Figs. 1 and 4. The ports proper extend about two thirds of the length of the cylinder and are provided with flaring tubular mouths that project in opposite directions vertically. A sliding abutment or cut-off H is arranged between these ports—that is to say, the inner sides of the tubular passages constituting the ports G G' are formed parallel and separated by a space equaling or slightly exceeding the thickness of the sliding abutment H. Thus a rectilinear guide is provided for the abutment by this construction, and the abutment is arranged between the ports so as to entirely separate them from each other. The inner end of the abutment H is provided with a pivoted device H', which in practical operation forms a part thereof. As shown in Fig. 3, this device is composed of a metal part *h* and a packing or wear portion $h'$. The part *h* is preferably formed of thick sheet metal which practically forms a tube that is open at one side, the edges of the metal sheet diverging at that point at a slight angle. The interior of the part *h* is filled with leather, which is inserted and secured in the tubular portion around rod $h^2$, passing through the center thereof and extending the entire length of the tube. The outer edge of the packing $h'$, which lies between the flaring wings or flanges of the tubular body, is slightly curved, corresponding to the radius of the piston, so that it will fit the periphery of the same, as shown in Fig. 4. The device H' is pivotally connected with the sliding abutment or cut-off H, it being held in a recess formed in the inner end of the abutment, the same being slightly more than a semicircle, so as to hold the device with due security while permitting it to oscillate freely. The cylindrical or tubular portion *h* of the oscillating device H' is adapted to slide endwise in the groove or socket formed in the end of the abutment, and when duly inserted it is held in place by the removable ends of the cylinder. It is apparent that as the piston B rotates it changes position in the cylinder, so that the device H cants or shifts gradually from one angle to another and always remains in perfect contact with the piston, so that the passage of water from one side to the other of the abutment is effectually prevented at that point. When leather is not used, the whole of the device may be constructed of solid metal. Leather strips are also provided in the longer limb of the piston and also in the sides of the sliding abutment H to serve as packing in a well-known way.

The sliding abutment or cut-off H is connected with the frame E in the following manner: The abutment is provided with a screw-shank $h^3$, (see Figs. 2 and 4,) which passes through the center of the bar E', forming an attachment of the frame proper, E. The ends of the side members or arms of the frame E are provided with screw-threaded extensions $e^2$, (see Fig. 5,) which pass through the openings in the ends of the bar E', nuts $e^3$ being applied to hold the bar in the required position. A nut $h^4$ (see Figs. 1, 2, 4) is applied to the outer end of the screw shank or stem $h^3$ of the abutment H and is in practice so adjusted as to allow the device H' to work in easy contact with the piston B. Spiral springs I (see Fig. 2) are arranged in opposite cavities in the abutment H and the bar E' and serve to exert pressure upon the abutment in the direction of the piston. The tension and pressure of these springs I are regulated by screws J, which work in threaded openings in the bar E', their inner ends bearing upon the disks, which in turn rest upon the springs. It is apparent that by adjustment of the screws J any required degree of tension may be produced. The nut $h^4$, before described as applied to the screw-shank of the abutment, prevents undue friction between the contact-piece H' and the piston, which might otherwise be caused by the springs I. On the inner side of the bar E', opposite the nut $h^4$, is arranged a nut $h^5$, (see Fig. 2,) the same being located in a cavity in the bar, and in practice it is so adjusted that a space is left between it and the bar, as shown, so that the abutment has due play or freedom of movement outward.

It will be seen that the frame E, with the bar E', is practically in the form of a parallelogram or oblong rectangle and surrounds the cylinder and is guided in its reciprocations, the abutment and the piston contact-piece H' moving with it, as before described. Rotation may be imparted to the pump-shaft C by any preferred means, and as the piston rotates water enters at G, a crescent-shaped space on one side of the piston, and as the longer limb or most eccentric portion of the piston moves away from the induction-port the water follows and fills the chamber and finds escape at G' when the piston has rotated past the same, the crescent chamber being thus filled and discharged at each rotation of the piston, so that a practically constant stream of water flows through the pump. The pump is adapted to receive and discharge at each rotation of the piston a quantity of water equal to forty per cent. of the cubical capacity of the cylinder.

What I claim is—

In a rotary pump of the class indicated, the combination, with the cylinder having induction and eduction ports, a rotary piston mounted eccentrically therein, a sliding abutment arranged between the ports and reciprocating in suitable guides, and a device working in contact with the piston and pivotally attached to the abutment, the same comprising a sheet-metal tube having a longitudinal slot and flanges or wings extending outwardly from the edges of the slot, and packing arranged in the tube and filling the spaces between the flanges, substantially as described.

In testimony whereof I have signed my name to this specification in the presence of two subscribing witnesses.

HARRY RETZER COMLY.

Witnesses:
FRANK S. JENNINGS,
HANS MURGUARDS.